United States Patent
Vesikivi et al.

(10) Patent No.: US 7,229,021 B2
(45) Date of Patent: Jun. 12, 2007

(54) INDICIA READER WITH SYNCHRONIZED LIGHT SOURCE AND ASSOCIATED METHODS AND COMPUTER PROGRAM PRODUCT

(75) Inventors: Petri Vesikivi, Espoo (FI); Pekka K. Viitaniemi, Espoo (FI)

(73) Assignee: Nokia Corporation, Espoo (FI)

( * ) Notice: Subject to any disclaimer, the term of this patent is extended or adjusted under 35 U.S.C. 154(b) by 79 days.

(21) Appl. No.: 10/862,704

(22) Filed: Jun. 7, 2004

(65) Prior Publication Data

US 2005/0269411 A1    Dec. 8, 2005

(51) Int. Cl.
    *G06K 7/10* (2006.01)
(52) U.S. Cl. ............... 235/462.01; 235/462.09; 235/462.42
(58) Field of Classification Search ........... 235/462.01, 235/462.09, 462.42, 462.46, 462.25
    See application file for complete search history.

(56) References Cited

U.S. PATENT DOCUMENTS

| | | | | |
|---|---|---|---|---|
| 5,513,264 A | * | 4/1996 | Wang et al. ............... 380/51 |
| 5,585,616 A | | 12/1996 | Roxby et al. | |
| 5,635,697 A | | 6/1997 | Shellhammer et al. | |
| 5,702,059 A | * | 12/1997 | Chu et al. ............... 235/472.01 |
| 5,818,528 A | * | 10/1998 | Roth et al. ............... 348/364 |
| 5,821,523 A | * | 10/1998 | Bunte et al. ............... 235/472.01 |
| 5,920,061 A | * | 7/1999 | Feng ............... 235/472.01 |
| 6,109,526 A | * | 8/2000 | Ohanian et al. ............... 235/462.45 |
| 6,123,263 A | * | 9/2000 | Feng ............... 235/462.42 |
| 6,177,683 B1 | | 1/2001 | Kolesar et al. | |
| 6,286,762 B1 | * | 9/2001 | Reynolds et al. ............... 235/472.01 |
| 6,415,978 B1 | * | 7/2002 | McAllister ............... 235/462.01 |
| 6,830,181 B1 | * | 12/2004 | Bennett ............... 235/440 |

FOREIGN PATENT DOCUMENTS

| | | |
|---|---|---|
| EP | 1 387 560 A2 | 2/2004 |
| WO | WO 98/18098 | 4/1998 |
| WO | WO 98/50814 | 11/1998 |

* cited by examiner

*Primary Examiner*—Ahshik Kim
(74) *Attorney, Agent, or Firm*—Alston & Bird LLP

(57) ABSTRACT

The present invention provides systems, methods and computer program-product of obtaining information from machine-readable indicia with a mobile device having an indicia reader incorporated therein. The mobile device uses one or more light sources that may illuminate the indicia under consideration, assist in the orientation and position of the indicia reading device, and provide indication to the user that information has been obtained from the indicia under consideration, by use of the one or more light sources. Control of the one or more light sources occurs through an application operating on a controller within the mobile device.

45 Claims, 6 Drawing Sheets

INDICIA READER WITH SYNCHRONIZED LIGHT SOURCE AND ASSOCIATED METHODS AND COMPUTER PROGRAM PRODUCT

FIELD OF THE INVENTION

The present invention generally relates to portable devices having indicia reading capabilities and, more particularly to equip a portable device having one or more devices capable of reading machine-readable indicia with one or more light sources that are synchronized with the reading of a machine-readable indicia to provide the user of the portable device guidance and feedback during the reading operation.

BACKGROUND OF THE INVENTION

Where mobile telephones were perhaps viewed by many as a luxury when first introduced into the marketplace, they are today viewed by our society as very important, convenient, and useful tools. A great number of people now carry their mobile devices with them wherever they go. This popularity of wireless communication has spawned a multitude of new wireless systems, devices, protocols, etc. Consumer demand for advanced wireless functions and capabilities has also fueled a wide range of technological advances in the utility and capabilities of wireless devices. Wireless/mobile devices not only allow voice communication, but also facilitate messaging, multimedia communications, e-mail, Internet browsing, and access to a wide range of wireless applications and services, and include devices capable of capturing digital images and reading/decoding machine-readable indicia.

Barcodes are well known in the art and have been in use for several recent decades. Though there have been some changes in barcodes since their inception (e.g., one-dimensional versus two-dimensional, etc.), there have been noticeable advancements in the way barcodes are read and processed. Generally, there are three types of barcode readers in use: scanner or laser based, light-emitting diode (LED) based and camera based. With the proliferation of mobile phones that are equipped with digital cameras, several mobile phone-based barcode reader concepts have emerged. Furthermore, machine-readable indicia other than barcodes are gaining acceptance and growing in popularity. Radio frequency identification (RFID) transponder tags are one such machine-readable indicia seeing increased use because, at least in part, of their ability to contain and transfer more information than a barcode. In addition to or instead of barcode readers, mobile phones or other portable devices may be equipped with RFID readers.

One such example of a mobile phone equipped with a barcode reader can be found in European Patent Application EP 1387560, "Portable terminal device, in particular a mobile phone, for barcode reading and for taking photographs," having as an applicant, Sharp Kabushiki Kaisha, with a priority date of Jul. 24, 2002 and having a named inventor of Takeharu Muramatsu (the "Muramatsu application"). The Muramatsu application discloses a portable telephone (10) that has a camera (12) for inputting information of an image of interest, a small light (13), which emits light through the operation of ON/OFF button (21) while reading a barcode, an LCD display part (15) for displaying information, and a control part (31) including a CPU for controlling the whole device. The control part (31) switches photography modes depending on the existence of objects such as natural images or barcodes. The control part (31) recognizes a barcode when the device switches to a mode for barcode photography. Then, the device notifies a user of the results of the recognition and then performs a predetermined process based on the content of the recognition.

The Muramatsu application discloses a mobile phone equipped with a digital camera capable of reading barcodes. The phone is further equipped with a small light source that is operated manually by the user in connection with the operation of reading barcodes. The light source provides lighting for performing the reading operation. In addition, the terminal is capable of notifying the user whether the barcode reading results in a success or a failure by way of providing a sound, voice or displaying a message on a display of the mobile phone.

While camera based barcode readers generally work fine in good lighting conditions, if lighting conditions are not ideal, barcode recognition may fail. Also, when a user is using a mobile phone with a camera capable of reading barcodes, the user may not be aware whether the device has successfully read the barcode. In addition, the user might also experience difficulties when pointing and adjusting the device to the barcode in order to read the codes. The Muramatsu application describes means for overcoming some of these challenges, however, it does not satisfactorily resolve issues regarding initial alignment of the camera with the barcode and power limitations inherent in portable devices. Therefore, other means are provided by this present invention to overcome the challenges presented and improve on the means provided in the Muramatsu application.

SUMMARY OF THE INVENTION

In light of the foregoing background, embodiments of the present invention provide an improved system and method for use of one or more light sources (e.g., LEDs) synchronized with the functions of an indicia reader in a portable device having an indicia reader incorporated therein, such as, for example, a mobile telephone having a camera capable of capturing and reading barcodes or a mobile telephone having a radio frequency identification (RFID) reader.

When considering the Muramatsu application against the present invention, it can be seen that the Muramatsu application fails to address the guiding and feedback aspects integrated into the synchronized light source. More particularly, in a barcode reading application, the Muramatsu application does not provide any initial guidance to users of a portable device about the proper distance or angle for reading a particular barcode. Embodiments of the present invention provide that information by way of a light beam emitted by the light source such as, for example, a LED. In the Muramatsu application, the feedback of a successful indicia reading operation is not provided to the user by way of the light source as the Muramatsu application describes other ways of providing feedback to the user upon a successful barcode read, including generating a sound, voice or displaying something on the display. However, those functions require additional power beyond what is needed for the light source and lead to increased overall terminal power consumption. Embodiments of the present invention, however, provide information about a successful indicia read operation to the portable device user by way of decreasing power consumption (i.e., switching the light source off).

The embodiments of the invention provide systems, methods and computer program-products for reading machine-readable indicia with a mobile device having an indicia reader incorporated therein, by use of one or more light sources that may illuminate the indicia under consideration, assist in the orientation and position of the indicia reading device, and indicate to the user a successful capture of the indicia under consideration, by use of the one or more light sources. The indicia may be, for example, a barcode or an RFID transponder tag.

Another aspect of the present invention is a method, system, device and a computer program product for improved barcode reading. The system of this aspect is comprised of a digital camera capable of capturing barcode patterns within its field of view when in operation; a light source such as at least one LED; and a processor coupled with the digital camera and the light source. The processor is programmed to switch the light source to emit light corresponding or directed to the field of view of the digital camera upon activation of a barcode reading operation in the camera. An image of the barcode is then captured by the camera and the captured barcode patterns received from the camera are decoded by the processor. As a result of the illumination, the captured images are generally more easily decodeable by the processor. Once the barcode pattern is recognized, the light source is switched off to provide visual confirmation to the user. In another related aspect, the camera field of view and the light source lighting area are adjustable, either independently or concurrently.

Similarly, the method and computer program product of this aspect of the invention control a terminal having a device for communicating with a machine-readable indicia. The terminal also has one or more sources of light. This method and computer program product perform the steps of first illuminating the machine-readable indicia with one or more sources of light when the terminal is set to communicate with the machine-readable indicia. Then, the method and computer program product provide for actual communication with the machine-readable indicia followed by switching off said one or more sources of light when said terminal has received information from said machine-readable indicia and recognized said information. In one embodiment, the machine-readable indicia is a barcode and the device for communicating with the machine-readable indicia is an electronic media device such as a digital camera. In another embodiment, the machine-readable indicia is a RFID transponder tag and the device for communicating with the machine-readable indicia is an RF transceiver.

These, and more aspects of the invention are described in greater detail in the drawings and description herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
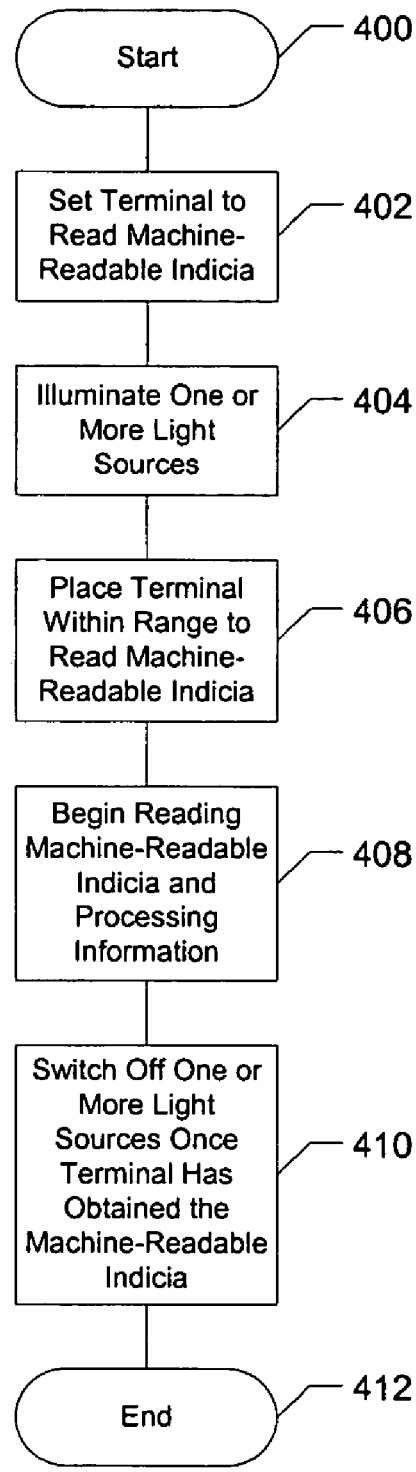
Figure 5:
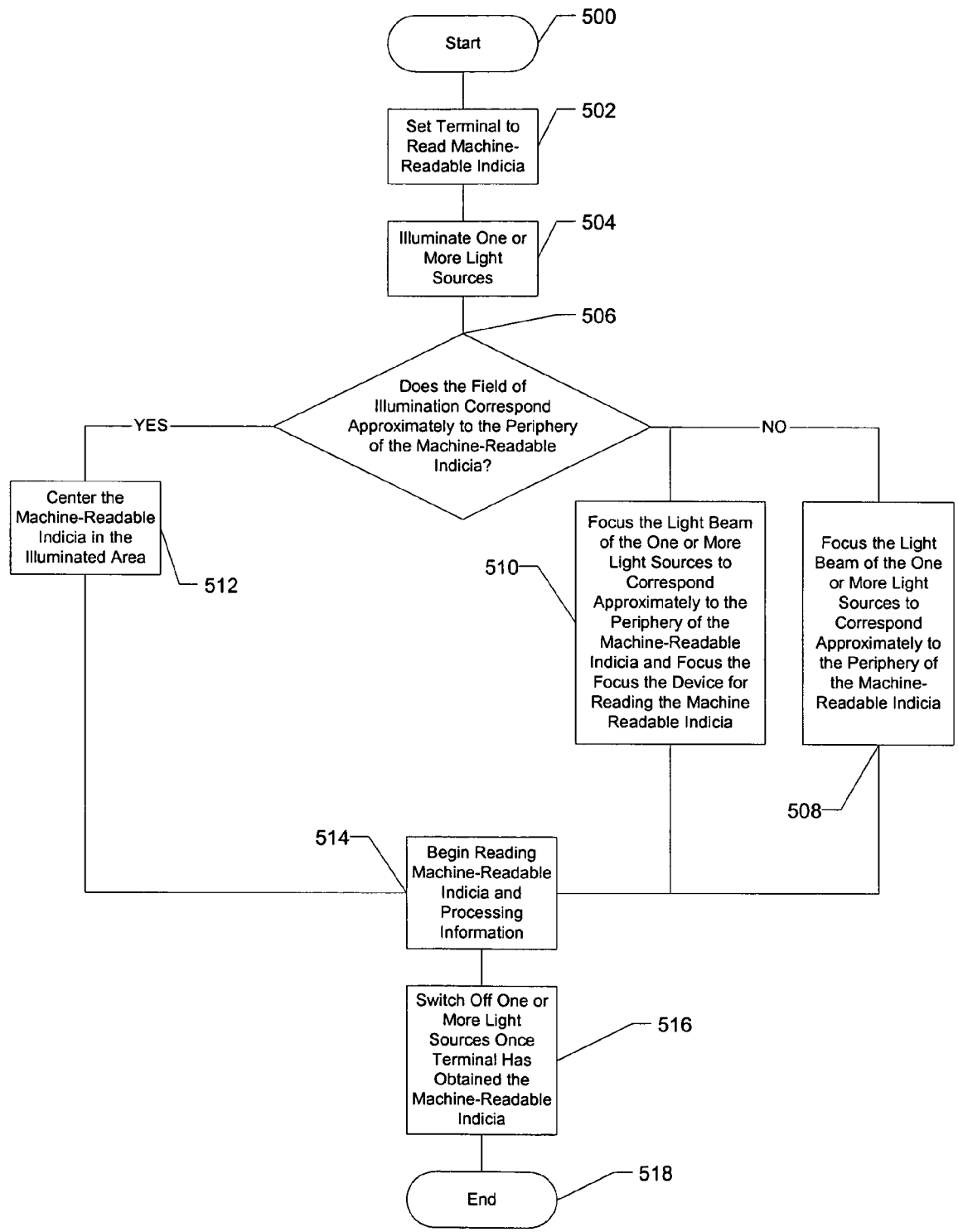

FIG. 4 is a flowchart that describes the steps of a process for obtaining information from machine-readable indicia, in accordance with one embodiment of the invention; and FIG. 5 is a flowchart that describes the steps of a process for obtaining information from machine-readable indicia, wherein the one or more light sources and the device for reading the machine-readable indicia may be focused, in accordance with one embodiment of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The embodiments of the present invention may be described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by and/or performed under the control of computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
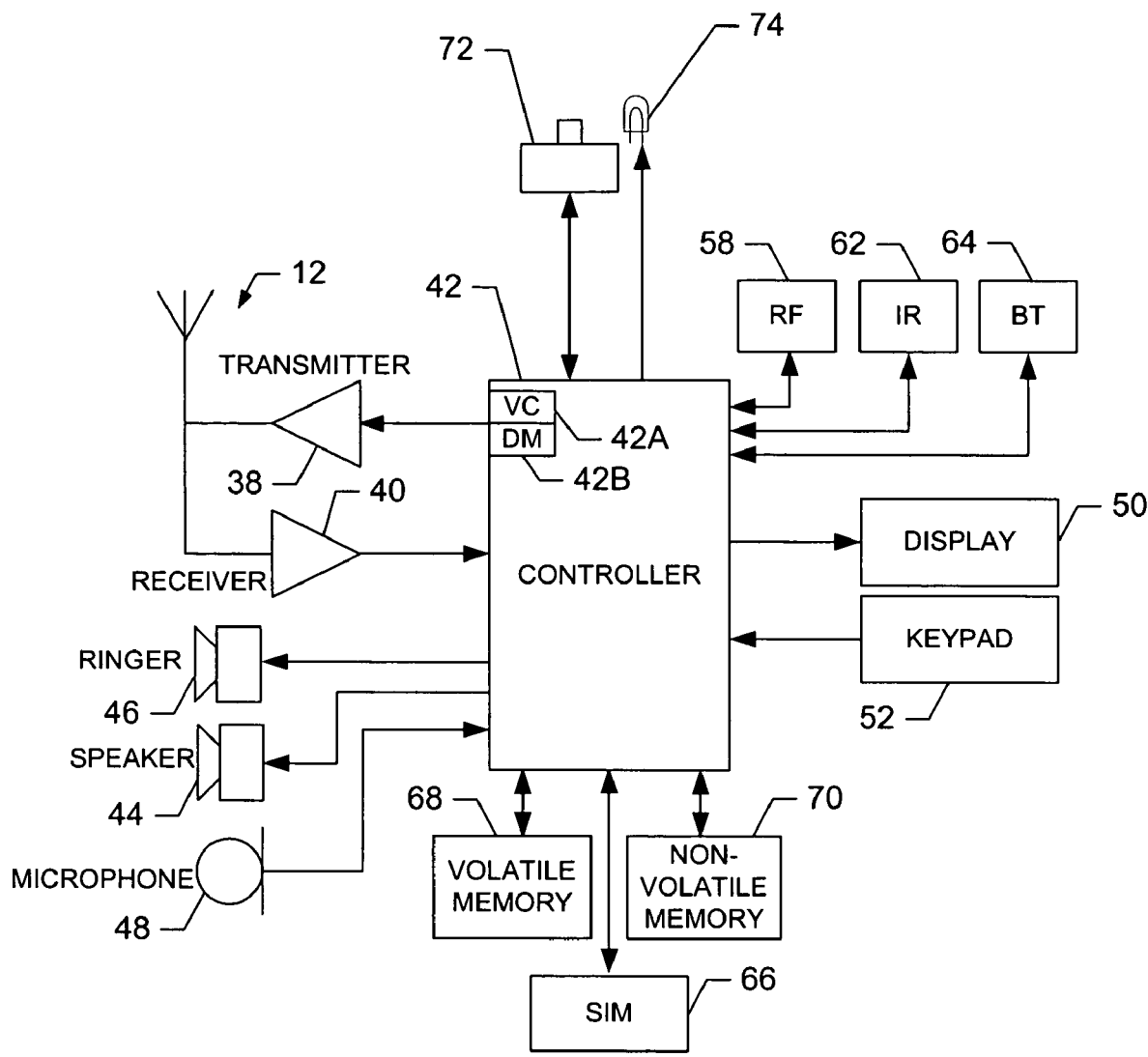
FIG. 1 is a schematic block diagram of a terminal comprising a mobile station, in accordance with one embodiment of the present invention.

Reference is now made to FIG. 1, which illustrates one type of terminal 10, a mobile station, which would benefit from embodiments of the present invention. It should be understood, however, that the mobile station illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

The terminal 10 can further be coupled to or incorporate one or more portable electronic media devices 33, such as digital cameras and/or other multimedia capturing, producing and/or storing devices. The terminal can be configured to communicate with the portable electronic devices in accordance with techniques such as, for example, radio frequency (RF), Bluetooth (BT), infrared (IrDA) or any of a number of different wireline or wireless communication techniques, including universal serial bus (USB), local area network (LAN) and/or wireless local area network (WLAN) techniques. The terminal may also be configured to communicate and/or read data from one or more machine-readable indicia using the same or similar techniques. Furthermore, as used herein, the terms "data," "content," "information" and similar terms may be used to interchangeably to refer to data capable of being transmitted, received and/or stored in accordance with embodiments of the present invention. Thus, use of any such terms should not be taken to limit the spirit and scope of the present invention.

As shown, in addition to an antenna 12, the mobile station includes a transmitter 38, a receiver 40, and a controller 42 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first generation (1G), second generation (2G), 2.5G and/or third-generation (3G) communication protocols or the like. For example, the mobile station may be capable of operating in accordance with 2G wireless communication protocols IS-136 (TDMA), GSM, and IS-95 (CDMA). Also, for example, the mobile station may be capable of operating in accordance with 2.5G wireless communication protocols GPRS, Enhanced Data GSM Environment (EDGE), or the like. Further, for example, the mobile station may be capable of operating in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 42 includes the circuitry required for implementing the audio, video and logic functions of the mobile station. For example, the controller may be comprised of a digital signal processor device, a microprocessor device, and various analog-to-digital converters, digital-to-analog converters, and other support circuits. The control and signal processing functions of the mobile station are allocated between these devices according to their respective capabilities. The controller can additionally include an internal voice coder (VC) 42A, and may include an internal data modem (DM) 42B. Further, the controller may include the functionally to operate one or more software programs, which may be stored in memory (described below). For example, the controller may be capable of operating a barcode decoding program that "reads" a captured image of a barcode. As another example, the controller may be capable of operating a connectivity program, such as a conventional Web browser. The connectivity program may then allow the mobile station to transmit and receive Web content, such as according to the Hypertext Transfer Protocol (HTTP) and/or the Wireless Application Protocol (WAP), for example.

The mobile station also comprises a user interface including one or more of a conventional earphone or speaker 44, a ringer 46, a microphone 48, a display 50, an electronic media device 72, one or more light sources 74, and a user input interface, all of which are coupled to the controller 42. The user input interface, which allows the mobile station to receive data, can comprise any of a number of devices allowing the mobile station to receive data, such as a keypad 52, a touch display (not shown) or other input device. In embodiments including a keypad, the keypad includes the conventional numeric (0-9) and related keys (#, *), and other keys used for operating the mobile station. Although not shown, the mobile station can include a battery, such as a vibrating battery pack, for powering the various circuits that are required to operate the mobile station, as well as optionally providing mechanical vibration as a detectable output.

The mobile station can also include one or more devices, software and/or logic for sharing and/or obtaining data from electronic devices, RFID transponder tags, barcodes, or the like. This aspect is further described in U.S. patent application Ser. No. 10/767,586, "TERMINAL, METHOD AND COMPUTER PROGRAM PRODUCT FOR INTERACTING WITH A SERVICE PROVIDER VIA A SIGNALING TAG," filed Jan. 29, 2004 and fully incorporated herein and made a part hereof (the "586 application."). Additionally, as described in the referenced patent application, the mobile station can communicate with a system or network, as shown in FIG. 1 of the referenced 586 application.

As shown in FIG. 1, the mobile station can include a short-range radio frequency (RF) transceiver or interrogator 58 so that data can be shared with and/or obtained from electronic devices including other radio frequency transceivers (shown as 60 in FIG. 1 of the referenced 586 application), and/or RFID transponder tags (also shown in FIG. 1 of the 586 application as 56). The mobile station can additionally, or alternatively, include other short-range transceivers, such as, for example an infrared (IR) transceiver 62, and/or a Bluetooth (BT) transceiver 64 operating using Bluetooth brand wireless technology developed by the Bluetooth Special Interest Group. The mobile station can therefore additionally or alternatively be capable of transmitting data to and/or receiving data from electronic devices and/or tags in accordance with such techniques. Although not shown, the mobile station can additionally or alternatively be capable of transmitting and/or receiving data from electronic devices and/or tags according to a number of different wireless networking techniques, including WLAN techniques such as IEEE 802.11 techniques or the like. Further, the mobile station can additionally or alternatively include a tag, such as an RFID transponder tag. For example, the mobile station can include a tag capable of transmitting and/or receiving data in accordance with any of a number of different wireline and/or wireless techniques in accordance with embodiments of the present invention.

The mobile station can further include memory, such as a subscriber identity module (SIM) 66, a removable user identity module (R-UIM) or the like, which typically stores information elements related to a mobile subscriber. In addition to the SIM, the mobile station can include other removable and/or fixed memory. In this regard, the mobile station can include volatile memory 68, such as volatile Random Access Memory (RAM) including a cache area for the temporary storage of data. The mobile station can also include other non-volatile memory 70, which can be embedded and/or may be removable. The non-volatile memory can additionally or alternatively comprise an EEPROM, flash memory or the like. The memories can store any of a number of pieces of information, and data, used by the mobile station to implement the functions of the mobile station. The memories can also store one or more applications capable of operating on the mobile station.

The applications capable of operating on the mobile station can comprise any of a number of different applications capable of being executed by the controller 42. For example, the applications can include one or more messaging applications, such as an E-mail application, short messaging service (SMS), multimedia messaging service (MMS) application or the like, capable of sending and receiving messages that may include data objects such as text, images, audio, video and/or other multimedia. Other applications include those capable of decoding images stored in the terminal's memory or as they are received from an electronic media device such as, for example, an image of a barcode as obtained by a digital camera. The decoded barcode information may be compared against one or more barcode standards or one or more ranges of acceptable barcode values to determine if the decoded barcode is recognized. Other such applications may receive information from one or more RFID transponder tags and determine whether such information is acceptable thereby recognizing such data. In addition, for example, the applications can include data object presentation and/or browser applications. In this regard, the applications can include an image viewer and/or browser application. Additionally, or alternatively, the applications can include a conventional Web browser. Further, for example, the applications can include directory applications, such as directory applications capable of presenting names and associated location identifiers, such as mobile telephone numbers, landline telephone numbers, SMS numbers, pager numbers, facsimile numbers, and/or electronic mail (E-mail) addresses of a number of contacts of a user of the mobile station. The applications are typically embodied in software, but as will be appreciated, one or more applications can alternatively be embodied in firmware, hardware or the like.

In one embodiment, as shown in FIG. 1, the mobile station further includes an electronic media device 72 such as, for example, a digital camera and/or a digital video recorder. This device can be used to obtain images and/or video that may be stored in the memory of the terminal, processed by the controller 42, or transmitted to other devices. In one embodiment the media device 72 is a digital camera that may be used to obtain an image of a barcode. The image of the barcode is then processed (e.g., decoded) by the processor 42, as such processing is known in the art, stored in memory, or transmitted to one or more other devices. Furthermore, as shown in the embodiment of FIG. 1, the electronic media device 72 operates with one or more light sources 74, as such operation is described in more detail below. The one or more light sources 74 may also operate in coordination with the RF transceiver 58 when receiving or transmitting information to an RFID transponder tag. When obtaining an image of a barcode with the media device 72, the one or more light sources 74 are switched on and illuminate the barcode to facilitate capturing the image, help the user with orientation and positioning of the media device 72, and provide visual indication to the user upon capture or decoding of the barcode.

Figure 2A:
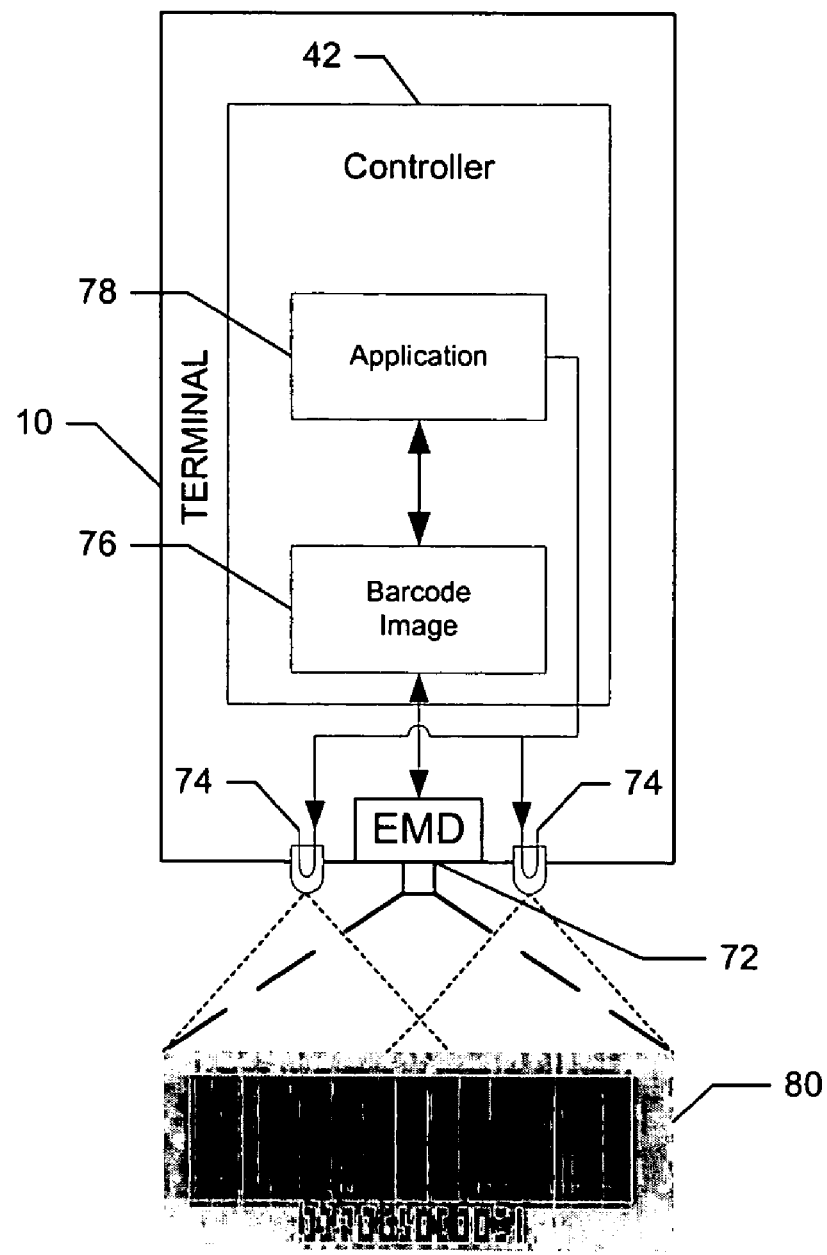
FIG. 2A illustrates a functional block diagram of a terminal obtaining information from a one-dimensional barcode, in one embodiment of the present invention.
Figure 2B:
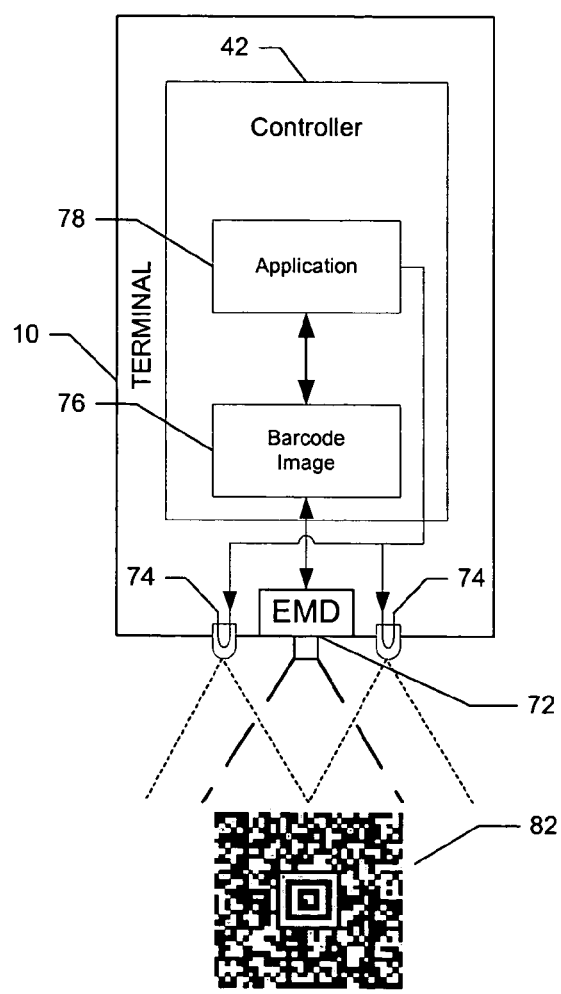
FIG. 2B illustrates a functional block diagram of a terminal obtaining information from a two-dimensional barcode, in one embodiment of the present invention.
Figure 2C:
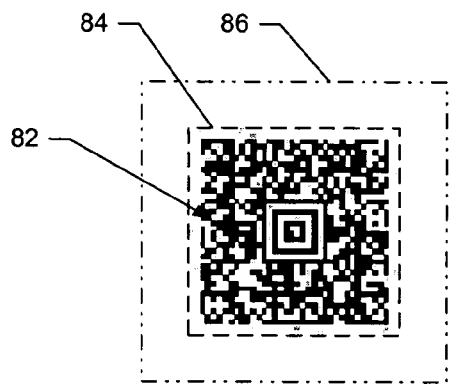
FIG. 2C illustrates a two-dimensional barcode surrounded about its periphery by the field of view (not visible to a user) of a digital camera, and is centered in the field of illumination (visible to the user) of one or more light sources, in accordance with one embodiment of the present invention.
Figure 2D:
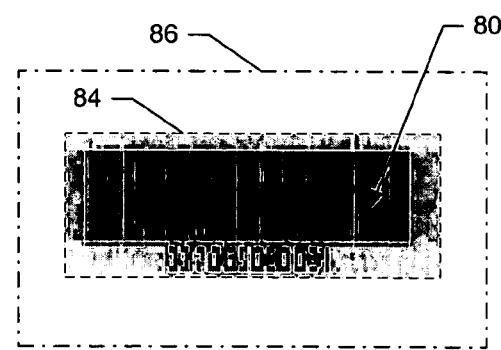
FIG. 2D illustrates a one-dimensional barcode surrounded about its periphery by the field of view (not visible to a user) of a digital camera, and is centered in the field of illumination (visible to the user) of one or more light sources, in accordance with one embodiment of the present invention.
Figure 3:
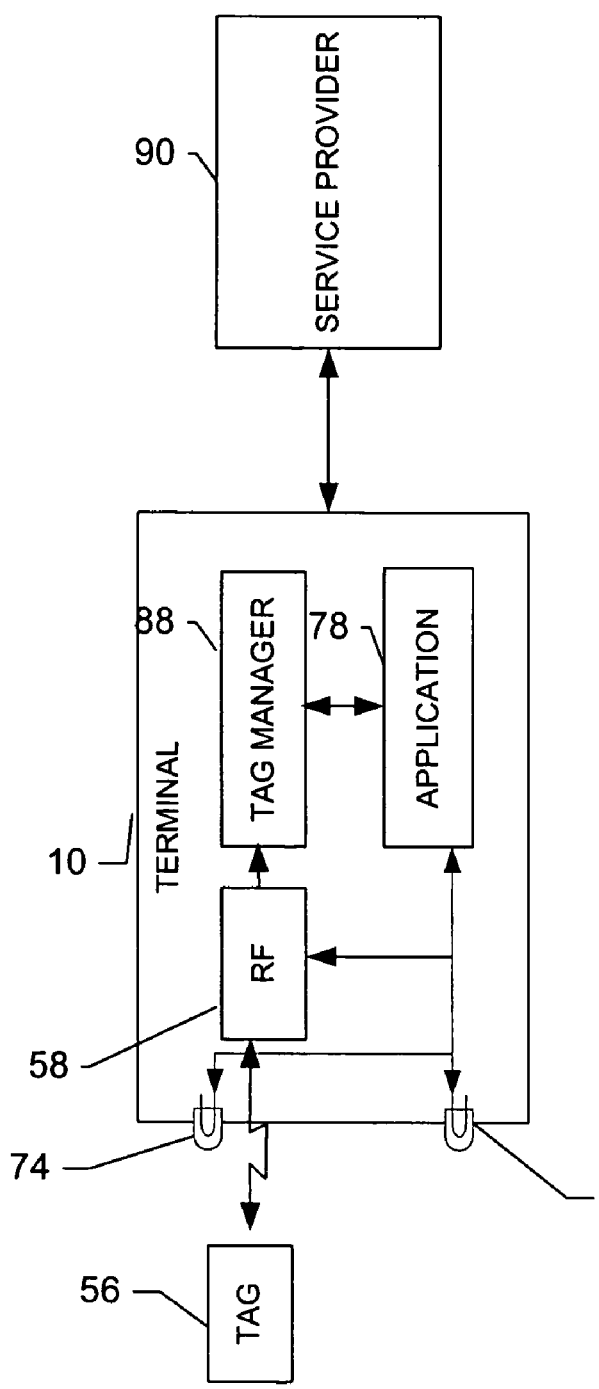
FIG. 3 is a functional block diagram of a terminal interacting with a service provider via a signaling tag, in accordance with one embodiment of the present invention.

Reference is now drawn to FIGS. 2A, 2B and 3, which illustrate functional block diagrams of a terminal 10 obtaining information from machine-readable indicia. More particularly, FIGS. 2A and 2B illustrate functional block diagrams of a terminal 10 having an electronic media device and one or more light sources obtaining an image of a barcode and decoding the barcode image. FIGS. 2C and 2D illustrate the field of view of an electronic media device and the field of illumination of one or more light sources of a terminal when reading a two-dimensional and a one-dimensional barcode, respectively, in accordance with embodiments of the invention. FIG. 3 illustrates a functional block diagram of a terminal 10 having a RF transceiver 58 receiving and/or sending information from or to a RFID transponder tag in another embodiment of the invention. It is to be appreciated that a terminal 10 may be equipped with one or more light sources 74 and either an electronic media device 72 or a RF transceiver 58, or both, an electronic media device 72 and a RF transceiver 58.

FIG. 2A is a functional block diagram of a terminal 10 having an electronic media device 72, in this instance a digital camera, obtaining an image of a one-dimensional barcode 80. The terminal 10 includes one or more light sources 74, in this instance two LEDs, though it is to be appreciated that the one or more light sources 74 may be comprised of sources of light other than LEDs and may have more or fewer sources than two. In the embodiment of this FIG. 2A, the terminal 10 is placed in a barcode selection mode at which point the controller operating pursuant to an application 78 stored in the memory 70 causes the one or more light sources 74 to switch on, thereby illuminating the barcode 80 under consideration. It is to be noted that the controller 42 performs functions under control of the application 78 as hereinafter described in more detail. Further, it is to be appreciated that the terminal 10 may be placed in the barcode selection mode either manually or automatically such as, for example, by obtaining an image of a barcode. Illumination of the barcode 80 will facilitate the electronic media device 72 (e.g., digital camera) in obtaining the image of the barcode 80. It is to be noted that the field of illumination of the one or more light sources 74 can either be set or may be adjusted either manually or automatically by the user such that the field of illumination corresponds approximately to the field of view of the electronic media device 72, as shown in FIG. 3A. Furthermore, in one embodiment, the field of view of the electronic media device 72 may be adjusted concurrently or independently of the field of illumination of the one or more light sources 74. In this manner, the user of the terminal 10 can visually determine whether they have positioned, angled and/or oriented the terminal 10 correctly for obtaining an image of the barcode 80 under consideration since the terminal 10 will be correctly positioned when the light sources 74 illuminate the barcode 80. A barcode image 76 is then at least partially captured by the electronic media device 72. The barcode image 76 is generally stored in the volatile memory 68 of the terminal 10, though it may be stored in the non-volatile memory 70 or other random access memory.

The controller 42 operating under control of the application 78 may access the barcode image 76 for decoding purposes as the barcode image 76 is being captured by the electronic media device 72 or at some time thereafter. As indicated above and described herein, the application 78 typically comprises software capable of being stored within memory (e.g., non-volatile memory 70), and operated by a processor (e.g., controller 42). It should be understood, however, that the application can alternatively comprise firmware or hardware, without departing from the spirit and scope of the present invention.

Once the barcode 80 is decoded by the controller 42 operating under control of the application 78, the one or more light sources 74 are turned off or otherwise visually altered (e.g., blinking, dimmed, change colors, etc.) by the controller 42 to indicate to the user with the one or more light sources 74 that the barcode 80 has been decoded and has been recognized by the controller 42 under control of the application 78. As previously described, recognition relates to comparing the decoded barcode value to one or more ranges of acceptable barcode values and/or determining whether the decoded barcode value meets acceptable barcode standards (e.g., ten digits with each digit having a value between 0 and 9, etc.) Alternatively, in one embodiment, the light sources 74 are turned off or otherwise altered by the controller 42 if an image of the barcode 80 is captured by the electronic media device 72. Without limitation, it is to be understood that information is obtained when it is recognized or when it is captured. In one embodiment, if the barcode is not recognized or an image is not obtained, then the controller 42 operating under control of the application 78 will automatically attempt to capture the barcode 80 in a second attempt. If the second attempt is unsuccessful, the application 78 causes an error message to be displayed in the display 50 of the terminal 10, or the user is otherwise visually, audibly, mechanically made aware that the barcode 80 under consideration has not been recognized and/or its image has not been obtained. In another embodiment, if the barcode is not recognized or an image not obtained within a time period as defined by a timer that resides as either hardware or software within the terminal 10, the application 78 causes an error message to be displayed in the display 50 of the terminal 10, or the user is otherwise visually, audibly, mechanically made aware that the barcode 80 under consideration has not been recognized and/or its image has not been obtained. In other embodiments, similar operations may occur in the event an RFID transponder tag is not read by the terminal is successive attempts or within a specified time period. It is to be noted that by turning off the one or more light sources 74 upon recognition of the barcode or capturing its image, the power supply of the terminal 10 is conserved. The decoded barcode information is then further processed by the terminal 10 and/or communicated to a service provider for further processing.

FIG. 2B is also a functional block diagram of a terminal 10 having an electronic media device 72, in this instance a digital camera and is similar to that described in FIG. 2A, above. Here, in FIG. 2B, however, the digital camera is obtaining an image of a two-dimensional barcode 82. The terminal 10 includes one or more light sources 74, in this instance two LEDs, though it is to appreciated that the one or more light sources 74 may be comprised of sources of light other than LEDs and may have more or fewer sources than two. In the embodiment of this FIG. 2B, the terminal 10 is placed in a barcode selection mode at which point an application 78 operated by the controller 42 causes the one or more light sources 74 to switch on, thereby illuminating the barcode 82 under consideration. Such illumination will facilitate the electronic media device 72 (e.g., digital camera) in obtaining the image of the barcode 82 by illuminating for the user the location of the field of view of the electronic media device 72 and by providing increased illumination of the barcode 82. It is to be noted that the field of illumination of the one or more light sources 74 can either be set or may be adjusted either manually or automatically by the user such that the field of illumination corresponds approximately to the field of view of the electronic media device 72. Furthermore, in one embodiment, the field of view of the electronic media device 72 may be adjusted concurrently or independently of the field of illumination of the one or more light sources 74.

However, as shown in FIG. 2B, the field of illumination may not be adjustable to exactly correspond with the field of view of the digital camera, particularly if multiple sources of light are used about the periphery of the lens of the digital camera. Therefore, as shown in FIGS. 2C and 2D, the barcode (either two-dimensional 82 or one-dimensional 80), may need to be centered in the field of illumination provided by the one or more light sources 74 in order to be correspondingly centered in the field of view if the electronic media device (e.g., digital camera). As shown in FIG. 2C, the two-dimensional barcode 82 is surrounded about its periphery by the field of view 84 (not visible to the user) of the digital camera, and is centered in the field of illumination 86 (visible to the user) of the one or more light sources 74. Likewise, as shown in FIG. 2D, the one-dimensional barcode 80 is surrounded about its periphery by the field of view 84 (not visible to the user) of the digital camera, and is centered in the field of illumination 86 (visible to the user) of the one or more light sources 74. In this manner, the user of the terminal 10 can visually determine whether they have positioned, angled and/or oriented the terminal 10 correctly for obtaining an image of the barcode 80, 82 under consideration. A barcode image 76 is then at least partially captured by the electronic media device 72. The barcode image 76 is generally stored in the volatile memory 68 of the terminal 10, though it may be stored in the non-volatile memory 70 or other random access memory. Alternatively, the barcode image 76 may not be stored and may be transferred to one or more other devices that may or may not be incorporated into the electronic media device 72. The controller operating under control of the application 78 accesses the barcode image 76 for decoding purposes as the barcode image 76 is being captured by the electronic media device 72 or following storage thereof. As indicated above and described herein, the application 78 typically comprises software capable of being stored within memory (e.g., non-volatile memory 70), and operated by a processor (e.g., controller 42). It should be understood, however, that the application 78 can alternatively comprise firmware or hardware, without departing from the spirit and scope of the present invention.

Once the barcode 80, 82 is decoded by the controller 42 operating under control of the application 78 or, alternatively, an image of the barcode 80, 82 has been captured, the one or more light sources 74 are turned off or otherwise visually altered (e.g., blinking, dimmed, change colors, etc.) by the controller 42 to indicate to the user with the one or more light sources 74 that the barcode 80 has been recognized by the controller 42 under control of the application 78. By turning off the one or more light sources 74, the power supply of the terminal 10 is conserved. The decoded barcode information is then further processed by the terminal 10 and/or communicated to a service provider for further processing.

Reference is now drawn to FIG. 3, which illustrates a functional block diagram of a terminal 10 having a RF transceiver 58 and one or more light sources 74 interacting with a signaling tag (e.g., tag 56), in accordance with an embodiment of the present invention. As shown and described herein, the terminal 10 of FIG. 3 operates a tag manager 88 to control interaction of the terminal 10 with a service provider 90 via a signaling tag 56. As indicated above and described herein, the tag manager 88 typically comprises software capable of being stored within memory (e.g., non-volatile memory 70), and operated by a processor (e.g., controller 42). It should be understood, however, that the tag manager 88 can alternatively comprise firmware or hardware, without departing from the spirit and scope of the present invention. The operations of the terminal 10, RF transceiver 58, tag manager 88, and service provider 90 are more fully described in the 586 application, U.S. patent application Ser. No. 10/767,586, previously incorporated herein and made a part hereof.

In one embodiment of the present invention as shown in FIG. 3, once the terminal 10 is placed in RFID selection mode, the application 78 causes the one or more light sources 74 to illuminate constantly or in the manner of a strobe or otherwise to visually indicate that the terminal 10 is in a state of readiness to communicate with a signaling tag 56. As described above, the one or more light sources 74 may provide a field of illumination that facilitates a user in communicating with the signaling tag 56 by providing an area of reference for communicating with the signaling tag 56 and assisting the user in positioning, angling and orienting the terminal 10. Also, once communication between the signaling tag 56 and the terminal 10 is complete, the controller 42 operating under control of the application 78 may cause the one or more light sources 74 to turn off or otherwise visually indicate to the user that communications are complete. By turning off the one or more light sources 74, the power of the terminal 10 will be conserved. Although RFID transponder tags and the reading thereof is generally not as directionally sensitive as barcodes, the one or more light sources 74 are not needed so much as to illuminate the RFID transponder tag but may serve to provide a visible indication of a successful real process.

FIG. 4 is a flowchart that describes the steps of a process for implementing an embodiment of the invention. The process begins at Step 400. At Step 402, a terminal equipped with a device for reading machine-readable indicia such as, for example, a digital camera or a RF transceiver, is placed in a mode for reading a machine-readable indicia (e.g., a barcode or a RFID tag). At Step 404, one or more light sources (e.g., LEDs) are illuminated such that they provide guidance for the user of the terminal as to how to position the terminal to read the machine-readable indicia and the distance from the terminal to the machine-readable indicia. At Step 406, the terminal is brought within a sufficient range for reading the machine-readable indicia. At Step 408, the device for reading machine-readable indicia in the terminal begins reading the machine-readable indicia under consideration and the information being read is processed by software executed by a controller or logic in the terminal. At Step 410, once the terminal has obtained (i.e., decoded or captured an image) the machine-readable indicia, the one or more light sources are switched off to visually indicate to the user that the machine-readable information has been captured. The process ends at Step 412.

FIG. 5 is a flowchart that describes the steps of a process for implementing an embodiment of the invention. As shown in FIG. 5, the process may include additional steps related to adjusting the field of illumination of the one or more light sources and/or the field of view of the electronic media devices. In FIG. 5, steps 500 through 504 are comparable to steps 400 through 404 of FIG. 4. At Step 506, however, it is determined whether the field of illumination of the one or more light source corresponds approximately to the periphery of the machine-readable indicia. If the field of illumination does not correspond approximately to the periphery of the machine-readable indicia, then at Step 508 the focus of the light emitted by the one or more light sources is adjusted to concentrate the field of illumination on the machine-readable indicia, or at Step 510 the field of illumination of the light emitted by the one or more light sources is adjusted to concentrate the field of illumination on the machine-readable indicia and the field of view of the device for reading machine-readable indicia is adjusted such that the device's field of view corresponds to the field of illumination. The process continues at Step 514. If, however, at Step 506, the field of illumination corresponds to the periphery of the machine-readable indicia, then at Step 512 the machine-readable indicia is centered in the illuminated area. At Step 514, the device for reading machine-readable indicia begins reading the machine-readable indicia under consideration and the information being read is processed by software operated by a controller or logic in the terminal. At Step 516, once the terminal has obtained (i.e., decoded or captured an image) the machine-readable indicia, the one or more light sources are switched off to visually indicate to the user that the machine-readable information has been captured. The process ends at Step 518.

Therefore, as described above, when a barcode reading operation is activated by a terminal, the one or more light sources (e.g., one or more LEDs) are lit to emit light that is generally arranged to correspond with the electronic media device's (e.g., camera's) current field of view. Thus, the lighted area serves to guide the user to point the terminal at the barcode under consideration at a sufficient range (i.e., distance from the barcode to the electronic media device) and angle. The light also helps the electronic media device to capture the barcode string in a more reliable manner, because it provides better operating environment for barcode image capturing. Then, a decoding application or logic in connection with the terminal's controller attempts to recognize the barcode under consideration and upon successful recognition, the one or more light sources are switched off in order to provide user of the terminal intuitive information that the barcode reading operation is completed.

According to an alternative embodiment of the invention, the electronic media device's focus can be adjustable based on whether the barcode reading pertains to reading one-dimensional or two-dimensional barcodes, as shown in FIGS. 2C and 2D. Also, in one embodiment, the light beam emitted by the one or more light sources is also adjustable by, for example, having two separate light sources or using a lens for adjusting the shape of the emitted light beam. In one embodiment, the focus of the electronic media device and the shape of the emitted light beam are adjusted concurrently, while in another embodiment, the electronic media device is focused independently from the shape of the light beam.

Furthermore, according to another embodiment, the present invention may be useful also when considering terminals having integrated RFID reading capability, so that when an RFID tag is read, the one or more light sources are switched off or other visual indication of a successful read is provided to the user by the one or more light sources.

According to one aspect of the present invention, all or a portion of the system of the present invention, such all or portions of the terminal 10, generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 4 and 5 are flowcharts of methods, systems and program products according to the embodiments of this present invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A terminal comprising:
   a controller capable of receiving information regarding at least one machine-readable indicia containing encoded information,
   an electronic media device for obtaining image information of said at least one machine-readable indicia; and
   one or more sources of visible light, wherein said electronic media device and said one or more sources of visible light are operable by said controller such that while said electronic media device is positioned with respect to said at least one machine-readable indicia and further while said electronic media device is obtaining image information of said at least one machine-readable indicia, at least a first one of said one or more sources of visible light remains consistently illuminated such that at least the first one of said one or more sources of visible light facilitates the electronic media device in obtaining the image information of said at least one machine-readable indicia until said controller is capable of detecting and decoding the obtained image information, wherein at least the first one of said one or more sources of visible light is turned off or otherwise visually altered once said controller is capable of detecting and decoding the obtained image information.

2. A terminal according to claim 1, wherein the at least one machine-readable indicia is a barcode.

3. A terminal according to claim 2, wherein the electronic media device is a digital camera.

4. A terminal according to claim 2, wherein the at least one machine-readable indicia is a one-dimensional barcode.

5. A terminal according to claim 2, wherein the at least one machine-readable indicia is a two-dimensional barcode.

6. A terminal according to claim 1, wherein the one or more sources of visible light are light-emitting diodes (LEDs).

7. A terminal according to claim 1, wherein the one or more sources of visible light have a defined field of illumination and the electronic media device has a defined field of view and said field of illumination corresponds to said field of view.

8. A terminal according to claim 1, wherein the one or more sources of visible light have an adjustable field of illumination and the electronic media device has a defined field of view and said field of illumination is adjustable to correspond to said field of view.

9. A terminal according to claim 1, wherein the one or more sources of visible light have a defined field of illumination and the electronic media device has an adjustable field of view, and said field of view is adjustable to correspond to said field of illumination.

10. A terminal according to claim 1, wherein the one or more sources of visible light have an adjustable field of illumination and the electronic media device has an adjustable field of view, and said field of illumination and said field of view are adjustable to correspond to one another.

11. A terminal according to claim 1, wherein at least the first one of said one or more sources of visible light are turned off or otherwise visually altered to indicate to a user of the terminal that said at least one machine-readable indicia has been recognized and decoded by the controller.

12. A terminal for interacting with a barcode comprising:
    a controller capable of receiving information regarding at least one barcode having information encoded thereon,
    an electronic media device for obtaining image information from said at least one barcode; and
    one or more sources of visible light, wherein said electronic media device and said one or more sources of visible light are operable by said controller such that while said electronic media device is positioned with respect to said at least one barcode and further while said electronic media device is obtaining image information from said at least one barcode, at least a first one of said one or more sources of visible light remains consistently illuminated such that at least the first one of said one or more sources of visible light facilitates the electronic media device in obtaining said image information from the at least one barcode until said controller is capable of detecting and decoding the obtained image information, wherein at least the first one of said one or more sources of visible light is turned off or otherwise visually altered once said controller is capable of detecting and decoding the obtained image information.

13. A terminal according to claim 12, wherein the electronic media device is a digital camera.

14. A terminal according to claim 12, wherein the at least one barcode having information encoded thereon is a one-dimensional barcode.

15. A terminal according to claim 12, wherein the at least one barcode having information encoded thereon is a two-dimensional barcode.

16. A terminal according to claim 12, wherein the one or more sources of visible light are light-emitting diodes (LEDs).

17. A terminal according to claim 12, wherein the one or more sources of visible light have a defined field of illumination and the at least one electronic media device has a defined field of view and said field of illumination corresponds to said field of view.

18. A terminal according to claim 12, wherein the one or more sources of visible light have an adjustable field of illumination and the at least one electronic media device has a defined field of view and said field of illumination is adjustable to correspond to said field of view.

19. A terminal according to claim 12, wherein the one or more sources of visible light have a defined field of illumination and the electronic media device has an adjustable field of view, and said field of view is adjustable to correspond to said field of illumination.

20. A terminal according to claim 12, wherein the one or more sources of visible light have an adjustable field of illumination and the electronic media device has an adjustable field of view, and said field of illumination and said field of view are adjustable to correspond to one another.

21. A terminal according to claim 12, wherein at least the first one of said one or more sources of visible light are turned off or otherwise visually altered to indicate to a user of the terminal that said at least one barcode has been recognized and decoded by the controller.

22. A method of obtaining information from one or more machine-readable indicia with a terminal having a controller, comprising:
 illuminating one or more sources of visible light associated with said terminal;
 positioning said terminal proximate to at least one of said one or more machine-readable indicia to facilitate communication between said terminal and said machine-readable indicia, wherein said terminal is positioned such that said machine-readable indicia is illuminated in a field of illumination of said one or more sources of visible light;
 receiving information from said machine-readable indicia with said terminal while said terminal is positioned proximate to said machine-readable indicia, wherein at least a first one of said one or more sources of visible light remains consistently illuminated while said terminal is positioned and further while said information is received; and
 turning off or otherwise providing a visual indication with at least said first one of said one or more sources of visible light when said information that has been obtained from said machine-readable indicia is detected and decoded by said controller.

23. The method of claim 22, wherein receiving information from said machine-readable indicia with said terminal comprises obtaining information from a barcode with a digital camera.

24. The method of claim 23, wherein receiving information from said machine-readable indicia with said terminal comprises obtaining information from a one-dimensional barcode with a digital camera.

25. The method of claim 23, wherein receiving information from said machine-readable indicia with said terminal comprises obtaining information from a two-dimensional barcode with a digital camera.

26. The method of claim 22, wherein receiving information from said machine-readable indicia with said terminal comprises obtaining information from a RFID transponder tag with a RF transceiver.

27. The method of claim 22, wherein positioning said terminal proximate to said at least one of said one or more machine-readable indicia such that said position facilitates communication between said terminal and said machine-readable indicia comprises positioning said terminal such that said machine-readable indicia is illuminated in a field of illumination of said one or more sources of visible light and said field of illumination of said one or more sources of visible light corresponds to the area in which the terminal is able to communicate with the machine-readable indicia.

28. The method of claim 22, wherein illuminating one or more sources of visible light associated with said terminal comprises illuminating one or more light-emitting diodes.

29. A method of obtaining image information from a barcode with a terminal having an electronic media device and a controller, comprising:
 illuminating one or more sources of visible light associated with said terminal;
 positioning said terminal proximate to said barcode to illuminate the barcode within a field of illumination from the one or more visible light sources and facilitate obtaining image information from the barcode with the electronic media device;
 obtaining image information from the barcode with the electronic media device while said terminal is positioned proximate to said barcode, wherein at least a first one of said one or more visible light sources remains consistently illuminated while said terminal is positioned and further while said image information is obtained; and
 turning off at least said first one of said one or more sources of visible light when said image information that has been obtained from said barcode is detected and decoded by said controller.

30. The method of claim 29, wherein obtaining image information from the barcode with the electronic media device comprises obtaining image information from a one-dimensional barcode with a digital camera.

31. The method of claim 29, wherein obtaining image information from the barcode with the electronic media device comprises obtaining image information from a two-dimensional barcode with a digital camera.

32. The method of claim 29, wherein positioning said terminal proximate to said barcode to illuminate the barcode within a field of illumination from the one or more visible light sources and facilitate reading the barcode with the electronic media device comprises positioning said terminal to illuminate the barcode with a field of illumination of the one or more visible light sources that corresponds to a field of view of a digital camera.

33. The method of claim 29, wherein illuminating one or more sources of visible light associated with said terminal comprises illuminating one or more light-emitting diodes.

34. The method of claim 29, wherein obtaining image information from the barcode with the electronic media device comprises obtaining image information from the barcode with a digital camera.

35. A method of controlling a terminal having a device for communicating with a machine-readable indicia, a controller, and one or more sources of visible light, comprising:
   illuminating the one or more sources of visible light when said terminal is set to communicate with a machine-readable indicia with the device for communicating with machine-readable indicia;
   enabling said terminal to be positioned with respect to said machine-readable indicia while at least a first one of the one or more sources of visible light remains consistently illuminated;
   communicating with said machine-readable indicia with said device for communicating with machine-readable indicia while at least the first one of said one or more sources of visible light remains consistently illuminated, wherein said terminal is positioned to illuminate the machine-readable indicia with a field of illumination of the one or more visible light sources; and
   turning off at least the first one of said one or more sources of visible light when said terminal has received information from said machine-readable indicia and said controller has detected and decoded said information.

36. The method of claim 35, wherein said machine-readable indicia is a barcode and the device for communicating with a machine-readable indicia is a digital camera.

37. The method of claim 35, wherein communicating with said machine-readable indicia with said device for communicating with machine-readable indicia comprises obtaining information from a one-dimensional barcode with a digital camera.

38. The method of claim 35, wherein communicating with said machine-readable indicia with said device for communicating with machine-readable indicia comprises obtaining information from a two-dimensional barcode with a digital camera.

39. The method of claim 35, wherein communicating with said machine-readable indicia with said device for communicating with machine-readable indicia comprises obtaining information from a RFID transponder tag with a RF transceiver.

40. The method of claim 35, wherein illuminating the one or more sources of visible light comprises illuminating one or more light-emitting diodes.

41. A computer program product for controlling a terminal having a device for communicating with a machine-readable indicia and one or more sources of visible light and a controller, the computer program product comprising a computer-readable storage medium having computer-readable program code portions stored therein, the computer-readable program code portions comprising:
   a first executable portion for illuminating the one or more sources of visible light when said terminal is set to communicate with a machine-readable indicia with the device for communicating with machine-readable indicia;
   a second executable portion for enabling the terminal to be positioned with respect to the machine-readable indicia while at least a first one of the one or more sources of visible light remains consistently illuminated;
   a third executable portion for obtaining information from said machine-readable indicia with said device for communicating with machine-readable indicia while at least the first one of said one or more sources of visible light remains consistently illuminated; and
   a fourth executable portion for turning off at least the first one of said one or more sources of visible light when said terminal has obtained information from said machine-readable indicia and said controller has detected and decoded said information.

42. A computer program product according to claim 41, wherein the executable portions are adapted to communicate with a machine-readable indicia that is a barcode and the device for communicating with a machine-readable indicia is a digital camera.

43. A computer program product according to claim 41, wherein the executable portions are adapted to communicate with a machine-readable indicia that is a RFID transponder tag and the device for communicating with a machine-readable indicia is a RF transceiver.

44. A computer program product according to claim 41, wherein the fourth executable portion is adapted to switch off at least the first one of said one or more sources of visible light when said terminal has obtained information from said machine-readable indicia into an actively-operating application on a controller in said terminal and said application decodes and recognizes said information.

45. A computer program product according to claim 41, wherein the third executable portion is adapted to obtain information to the terminal when the terminal is actively operating an application in a state of receiving data.

* * * * *